United States Patent [19]
Reedy et al.

[11] Patent Number: 4,718,063
[45] Date of Patent: Jan. 5, 1988

[54] OPTOELECTRONIC INTEGRATED CIRCUIT MULTIPLEX

[75] Inventors: Ronald E. Reedy; Jay H. Harris; Donald J. Albares, all of San Diego, Calif.

[73] Assignee: The United States of America as represented by the Secretary of the Navy, Washington, D.C.

[21] Appl. No.: 746,704

[22] Filed: Jun. 20, 1985

[51] Int. Cl.⁴ .............................................. H04J 3/04
[52] U.S. Cl. ...................... 370/112; 307/242; 307/243; 328/104; 370/115
[58] Field of Search .............. 370/108, 112, 114, 115, 370/4; 307/241, 242, 243, 244, 117, 311; 328/104, 105; 250/227, 551; 350/96.11, 96.13, 96.14; 357/30

[56] References Cited

U.S. PATENT DOCUMENTS

| | | | |
|---|---|---|---|
| 3,105,197 | 9/1963 | Aiken | 328/104 |
| 3,238,298 | 3/1966 | Willis | 178/50 |
| 3,541,265 | 11/1970 | Greefkes | 370/108 |
| 3,886,369 | 5/1975 | Porter | 250/551 |
| 3,931,514 | 1/1976 | Patterson | 250/206 |
| 4,064,360 | 12/1977 | Koenig | 178/3 |
| 4,376,285 | 3/1983 | Leonberger et al. | 357/30 |
| 4,409,683 | 10/1983 | Woodward | 370/112 |
| 4,412,324 | 10/1983 | Glowinsky et al. | 370/58 |
| 4,546,249 | 10/1985 | Whitehouse et al. | 455/610 |
| 4,568,834 | 2/1986 | Sherman | 370/112 |

FOREIGN PATENT DOCUMENTS 58-187912  11/1983  Japan ................................. 350/96.14

OTHER PUBLICATIONS

Bar-Chaim et al.–Integrated Optoelectronics–IEEE Spectrum, May 1982, pp. 38–46.
Tell et al.–"Multiplexer at 5 Gbits/sec"–Electronics Letters, Dec. 8, 1977, vol. 13, #25, pp. 765, 766.

*Primary Examiner*—Joseph A. Orsino, Jr.
*Attorney, Agent, or Firm*—Robert F. Beers; Ervin F. Johnston; Thomas Glenn Keough

[57] ABSTRACT

An apparatus and method for improving VLSI and VHSIC system data transmission relies on a plurality of optoelectronic switches actuated by pulses from at least one light source, a laser. Differing lengths of optical fibers couple the pulsed light from the laser at different times to create a sequence of actuation light pulses for the plurality of optoelectronic switches each time the light source is pulsed. Thus the information appearing at a plurality of parallel data nodes is converted to serial form at an output bonding pad on the chip. Optionally, a similar pulsing of electrooptic switches coupled to an input bonding pad converts serial data to parallel form. Faster input and output switching times are provided, reliability and complexity are reduced, particularly as compared to off-chip coupling arrangements, and power consumption and dissipation are reduced.

9 Claims, 6 Drawing Figures

FIG. 1

PRIOR ART

OPTOELECTRONIC INTEGRATED CIRCUIT MULTIPLEX

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Several problems are associated with data transfer to and from VLSI and VHSIC chips and concern the large number of interconnections and their relatively low data rate. One bothersome limitation arises in that the transfer from the chips is limited in rate due to the large effective load capacitance on the output drivers, typically in the range of 30-50 picofarads. Generally speaking, in a conventional hardwire scheme each interconnection is dedicated to one bit of the digital word; parallel transmission on and from the chip usually is the rule. The effective load capacitance and vast number of parallel interconnections are interrelated since they both impact power consumption and the silicon area which must be dedicated to data transfer (in particular, transfer from the chip).

Figure 1:
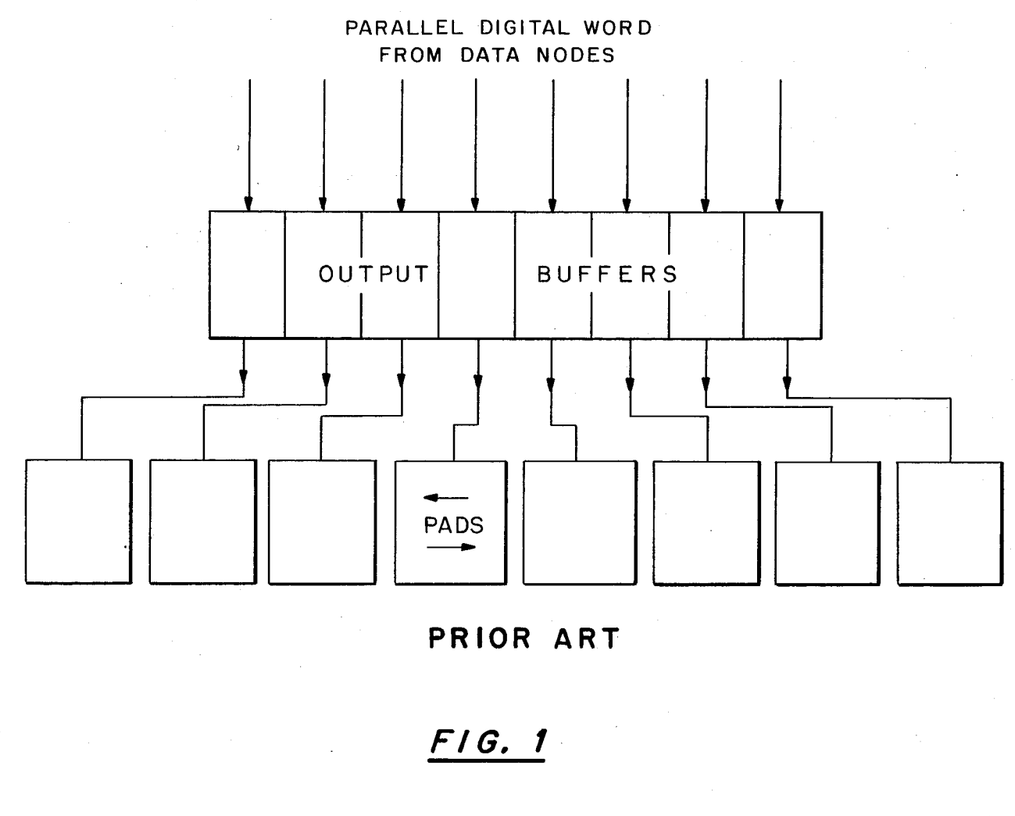
FIG. 1 shows a state-of-the-art data transmission bottleneck that appears in conventional integrated chip architecture.

Off-chip data transmission from VLSI and VHSIC chips has serious limitations. Output buffers are needed to drive the capacitance of the bonding pads and wires attached to the chip carrier conductors. Charging this capacitive load, typically 30-50 picofarads, has required large MOS transistors, thus limiting speeds to about 10-megabits per second. Consequently, digital words are transmitted in parallel both on and off the chips as illustrated in FIG. 1. There are as many output pads as there are data nodes and each interconnection has an output buffer. This approach has resulted in a large number of output interconnections which reduces reliability, requires significant chip area and consumes 10-25% of the chip power budget. In addition since the VLSI and VHSIC devices operate at speeds greater by 10 or 100 times with respect to the reduced output data rates at the off-chip bottleneck, the chips are compromised further. This places significant limitations on systems architecture, particularly with regard to data formatting, partitioning and spatial distribution of computers. New developments in down scaling of devices will increase device speed and density, without affecting output buffer loading, thus exacerbating the off-chip data bottleneck.

Viewed from a different aspect, it can be said that the three root causes of the input and output limitations of conventionally designed VLSI and VHSIC chips can be gathered under the three designations of complexity-reliability, input-output speed and power dissipation.

Complexity and resultant reliability consequences have arisen with the increasing number of interconnections within more powerful digital systems. The number of interconnections is approximately proportional to the square root of the number of gates in the system. The reliability of a system is inversely proportional to the number of interconnections. These two factors have driven systems designers to VLSI and VHSIC; however, due to ever increasing system size, the total number of connections is still increasing so that there still is a decreasing of overall reliability.

This leads designers to consider that a desirable feature for any new technique for inputs and, particularly, outputs is a reduction of the number of connections. Reduction of the number of connections contributes toward a reduction in the area required to accommodate them. Area arrays on interconnected pins on 0.1" center and perimeter arrays (for example, leadless chip carriers with outputs on 0.03" centers) yield pin densities of approximately one hundred pins/in$^2$. For a 50,000 gate system Rent's Rule predicts approximately 3,000 interconnected pins on thirty in$^2$ of circuit board at one hundred pins/in$^2$. This compares to the approximately 0.1 in$^2$ of chip area. With the proper scaling the chip area will decrease and the present area ratio of 300:1 will exceed 1,000:1 illustrating the dominant role of interconnections in VLSI and VHSIC packaging.

The second root cause concerning the input-output speed of the integrated circuit affects the chip size. The driving force to scale down the size of integrated circuit devices is to increase the device speed. Several scaling schemes have been proposed, of which two that apply to MOS technologies, are the constant field scaling and constant voltage scaling. Considering only the zeroeth order effects and the general impact of device scaling, constant field scaling requires that all linear dimensions and voltages are reduced by some factor "S" while the channel doping is increased by the same factor. The inherent inverter delay decreases by S and internal electric fields and the power density remain constant. However drive current is reduced by a factor of S and operating voltages must be reduced. This leads to noise margin problems as kT does not change and crosstalk increases with speed. With constant voltage scaling linear dimensions are reduced by S, operating voltages remain constant and channel doping increases by $S^2$. This scaling scheme causes the reduction of the propagation delay by S and the noise margin and saturation current are maintained with the power density increasing as $S^3$. As a consequence, constant voltage scaling is precluded for all but special purpose functions.

The two scaling schemes just discussed result in an increased on-chip operating speed proportional to the scaling constant; however, the operating speed of a circuit is not necessarily limited by the inherent inverter delay; rather, it is presently limited by the time required to charge a capacitive load. The constant field scaling scheme calls for a reduction of both the voltage and the maximum drive current by the scaling factor S and, consequently, the switching speed of an inverter is proportional to the scaling of the load capacitance. This applies to both on-chip circuitry and output line drivers. In the on-chip case, the load capacitance is reduced by S and on-chip speed increases by S. For output drivers however, the load capacitance from subsequent inputs, packages, circuit boards, connectors, etc., is not reduced and off-chip speed would remain unaffected by device scaling. Therefore the development of lower capacitance input-output techniques are necessary to exploit VLSI and VHSIC chips.

The last root cause of problems associated with data transfer to and from VSLI and VHSIC chips is the power dissipation. For a silicon chip operating at room temperature, the maximum possible heat conduction through the silicon to the package is approximately 20-watts/cm$^2$. However the maximum rate at which heat can be removed from the package by forced air cooling is less than 1-watt/cm$^2$. Therefore, any air cooled system must provide a cooling area at least twenty times greater than the chip area if the chips are to be operated at their internal heat conduction limit. The foregoing analysis ignores other heat sources such as external resisters and power supplies which increase the heat load without increasing the number of gates in the system. For liquid cooled systems cooling rates up to 7-watts/cm$^2$ have been reported. These liquid cooling systems are more applicable to fixed systems than to mobile systems. Typically 10–25% of the power consumed by VLSI or VHSIC are due to output buffers. Increased performance requirements for output buffers will increase this percentage and further aggravate the cooling problem. Any new output scheme must address the power consumption limitation.

Therefore, a continuing need exists in the state-of-the-art for an apparatus and method for improving the data transfer capabilities to and preferably from VLSI and VHSIC chips that avoids the root causes of input/output limitations as discussed hereinabove.

SUMMARY OF THE INVENTION

The present invention is directed to providing an apparatus and method for improving VLSI and VHSIC data transmission. An integrated circuit chip is provided with a plurality of parallel data nodes and a plurality of optoelectronic or photoconductive switches integrally contained in the integrated circuit chip with an optoelectronic switch being serially disposed in each microstrip extending to each of the parallel data nodes. At least one of a number of bonding pads which is also part of the chip's circuitry is coupled to several of the microstrips that extend from a like number of the plurality of optoelectronic switches to receive the outputs from or provide inputs for a like number of parallel data nodes. A light source, emitting pulses of light, is operatively disposed with respect to the first ends of a plurality of optical fibers and the other ends of the fibers are located to each actuate a discrete optoelectronic switch. The fibers are dimensioned to have lengths differing one from the other to create a sequence of actuation light pulses for the optoelectronic light switches each time the light source is pulsed. The optoelectronic switches thereby provide time division multiplexed serial data from the plurality of data nodes at each of the bonding pads when the data nodes are parallel output data nodes or time division demultiplex of incoming serial data to a plurality of parallel input data nodes.

The method for improving VLSI and VHSIC off-chip data transmission includes fashioning an integrated circuit chip having a plurality of parallel data nodes with a plurality of optoelectronic switches on the integrated circuit chip with each optoelectronic switch being connected in series in a microstrip extending to one of the parallel data nodes. Locating a number of bonding pads about the periphery of the integrated circuit chip and coupling a plurality of the microstrips each extending from a like number of the plurality of optoelectronic switches assures the coupling of a like number of parallel data node output to at least one of the bonding pads each time the pulsing of a light source occurs. Time division multiplexing of data through the parallel data nodes is assured by the inclusion of a number of differently lengthened optical fibers each extending from the light source to a discrete optoelectronic light switch such that a sequence of actuation light pulses for the plurality of optoelectronic switches is created each time the light source is pulsed. Time division multiplexing of serial data from the plurality of parallel output data nodes at the bonding pads and/or time division demultiplexing of serial data to a plurality of parallel input data nodes is readily accomplished thereby.

The prime object of the invention is to provide an apparatus and method for improving integrated circuit chip, off-chip data transmission.

Yet another object is to provide an improved integrated chip data transmission having higher reliability, higher data rates and less power drain than contemporary designs.

Still another object of the invention is to provide for improved integrated chip data transmission employing on-chip mounted optoelectronic switching.

Still another object is to provide for improved integrated chip data transmission relying upon time division multiplex switching by optoelectronic switches to convert parallel data into serial form or serial-to-parallel form.

Yet another object of the invention is to provide for an improvement in integrated chip data transmission calling for laser actuated optoelectronic switches via differently lengthened fiberoptics to create a time division multiplexing of data appearing to or from a plurality of parallel data nodes in the integrated circuit chip.

Still another object is to provide for optoelectronic switches disposed in-line in microstrips to effect time division multiplex switching of a multitude of signals from a like number of parallel data nodes to at least one bonding pad provided on the chip.

Still another object of the invention is to provide faster switching of data to and from an integrated circuit chip by reason of optoelectronic switches coupling data from a multitude of parallel data nodes to serial form at at least one bonding pad on the chip.

Still yet another object is to provide for a method of realizing the inherent advantages of fast integrated circuit chips by time division multiplex switching via a plurality of optoelectronic switches.

Another object is to provide for improved integrated circuit chip data transmission relying upon differently lengthed fibers operatively associated with a like number of optoelectronic switches for time division multiplexing of parallel data into serial form or serial-to-parallel form at at least one bonding pad.

These and other objects of the invention will become more readily apparent from the ensuing specification along with the accompanying drawings when read in conjunction with the appended claims.

DESCRIPTION OF THE PREFERRED EMBODIMENTS

Figure 2:
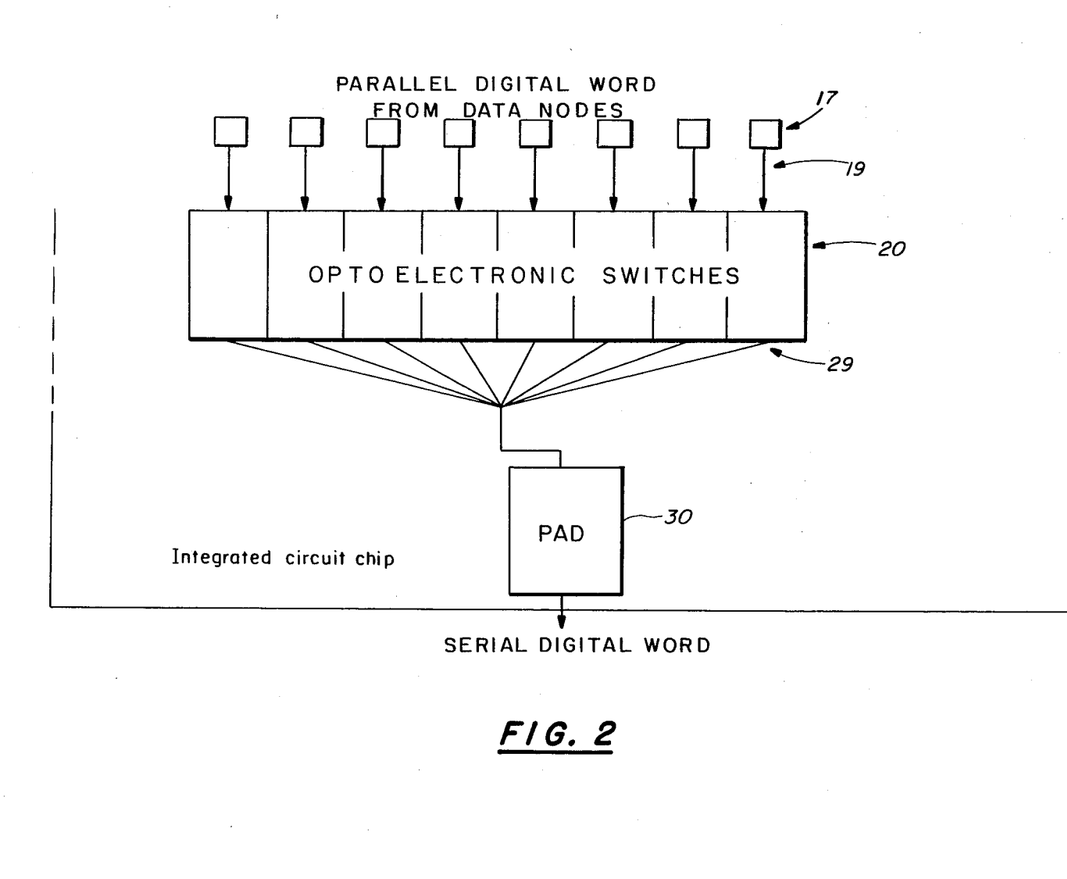
FIG. 2 shows a schematic representation of the improvement embraced by the apparatus and method herein disclosed.

Referring now to the drawings and in particularly to FIG. 2, a new approach is depicted for faster time sampling of data from the data nodes of an integrated circuit chip. The scheme as portrayed in the Fig. concerns the outputting of data from a number of parallel data nodes 17 to one pad 30 of a number of bonding pads on an integrated chip. The concept herein disclosed is equally applicable to inputting a number of parallel data nodes on an integrated circuit chip as well as the combined inputting and outputting function to and from an integrated circuit chip.

Irrespective which specific adaptation is selected, that being output switching to bonding pads, input switching to bonding pads or a combination of input and output switching, optical control signals generated off chip are suitably connected to actuate optoelectronic switches 20 and effect short time sampling and switching of data signals.

Each of the data nodes 17 is connected via a microstrip 19 to one of a plurality of like number of optically activated optoelectronic switches 20. A like microstrip 29 is coupled from each of the optoelectronic switches to a bonding pad 30 which may be one of a number of such pads conventionally mounted on an integrated circuit chip. From several to tens of data nodes and their interconnected optoelectronic switches may be connected in parallel to the same bonding pad. When the optoelectronic switch is closed by an externally generated light signal, an appropriate high or low voltage, corresponding to the state of the data node, is transmitted to the bonding pad via the switch.

Each of the microstrips is fabricated in accordance with accepted integrated circuitry chip assembly procedures to assure that signal transfer occurs in a fraction of its associated clock period of the integrated circuitry components. When the optoelectronic switches are closed in a predescribed sequence to be elaborated on below, the electrical signal appearing at the commonly connected bonding pad constitutes a time sequenced sample of the data on the data nodes. In other words, the signals representing information which appear on the number of parallel data nodes is time division multiplexed into serial data form by the sequential actuation of the optoelectronic switches. The structure for assuring the proper fast actuation sequences provides a key advantage of this concept in that only the optoelectronic switches and their interconnected microstrips need respond in time periods shorter than a given clock period.

Accumulated benefits stem from time division multiplexing to serialize digital words going to or coming from a VLSI or VHSIC chip to reduce the number of off-chip electrical connections by the multiplexing ratio used on the chip. This reduction of connections improves the reliability of the system and provides designers the capability for having the performance being essentially independent of device scaling to allow the accommodation of future increases in integrated circuit performance. The well known principle of multiplexing is advantageously employed to improve the effectiveness of integrated circuit chips through the inclusion of optoelectronic switches 20, or shown in greater detail in FIG. 3 as optoelectronic switch 20'.

Figure 3:
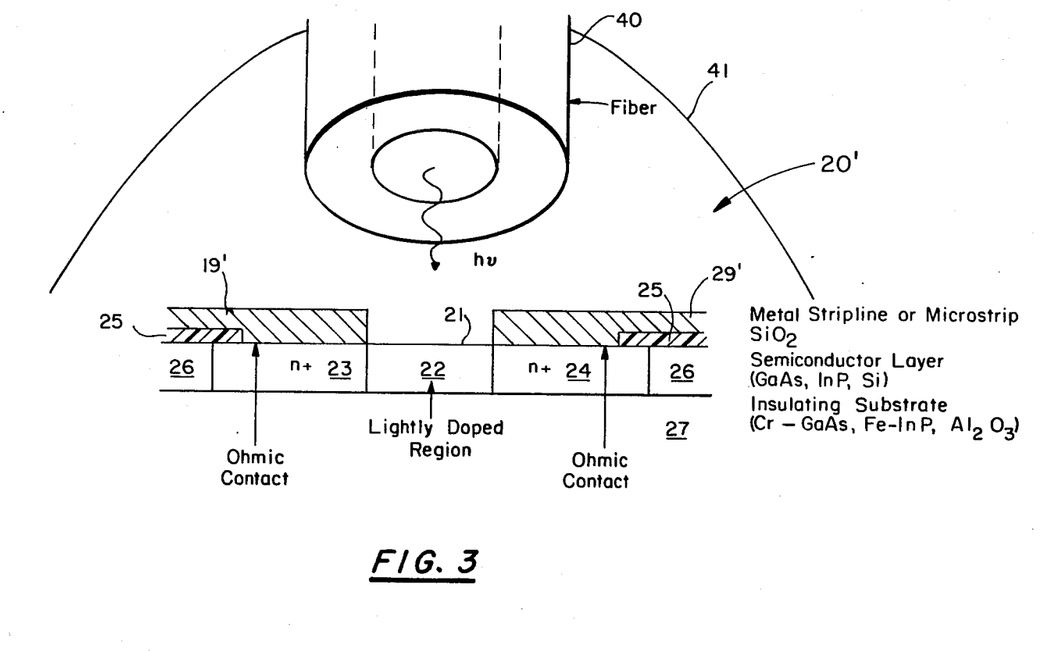
FIG. 3 shows a schematic, not to scale, typical arrangement of a microstrip with interposed photoconductive material forming an optoelectronic switch.

Each optoelectronic switch includes a part of the microstrip or metal stripline 19' and 29' which lead from one of the parallel data nodes or to the common bonding pad, respectively. A gap 21 in the micron range separates microstrips 19' and 29' and a high resistivity photoconductor 22 bridges the gap. The photoconductor material can be any one of several known materials, such as lightly doped GaAs, InP or Si on sapphire substrate.

Ohmic contacts 23 and 24 provide metal/n+ junctions and silicon dioxide insulation layers 25 insulate the microstrips from a semiconductor layer 26 which overlies an insulating substrate 27. The materials of the semiconductor layer, GaAs, InP or silicon as well as the materials of the insulating substrate Cr-GaAs, Fe-InP or $Al_2O_3$ are selected from a number of various materials to implement the optoelectronic switch. Other possibilities include InP, silicon on sapphire (SOS) or polycrystalline silicon on silicon dioxide on bulk silicon substrates for silicon based applications. Choice of materials affects the minority carrier lifetime and carrier velocity, which in turn affect laser power requirements, maximum data rate and other performance factors. A recent treatise on the capabilities of optoelectronic devices is found in the work by Chi. H. Lee entitled *Picosecond Optoelectronic Devices*, Academic Press, Inc. (1984) in which the simplicity, scalability, and jitter-free nature of optoelectronic devices are throughly discussed as they meet a critical need for providing for high speed switching.

An optical fiber 40 is brought in close proximity to the photosensitive material that spans the gap between the colinear lengths of microstrip 19' and 29'. The fiber has a core surrounded by cladding and can be single or multimode to transmit sufficient incident light to generate hole-electron pairs in the photosensitive material which are accelerated across the lightly doped region thereby conducting current. With the sufficient light which comes through the fiber the gap becomes highly conductive resulting in a sharp-edged traveling wave propagating down microstrip 29'.

A minimum gap separation is sought to give maximum switch conductivity for a given incident optical power. The separation of the gap is limited primarily by standoff voltage and dark current. Typically in this case having digital logic levels of about 5-volts, the gap could be significantly less than 1-micron before dielectric breakdown. Dark current increases as the gap narrows, that is to say, a rectangular gap 50-microns wide with a 5-micron separation on a 0.5 conducting layer with 100-ohms per centimeter resistivity would have tens of microamps dark current at 5-volts applied bias. Typically, the fiber can be brought within about 10 microns to provide sufficient light to initiate conduction across the gap. A U-V curable adhesive 41 can be applied to secure the end of the fiber in place when the desired location of the fiber is made via a micropositioner or the like. A hemispherical or other properly shaped lens is used at the fiber's end to concentrate the light on the gap if needed, the latter not being shown in the figure.

While a straight in-line gap has been shown in the figure an interdigital electrode configuration can be tailored to match the light beam from the fiber and to reduce alignment sensitivity between the fiber and the optoelectronic switch configuration. The interdigital electrodes are fashioned from the ends of the microstrips.

The optoelectronic time division multiplexing technique hereindescribed is applicable to a number of integrated circuits fabricated in accordance with several well established procedures from a variety of materials. The requirements may differ for each material due to differences in desired electronic and optical operations as well as taking into consideration the various fabrication characteristics. In each material optoelectronic switches have been demonstrated to operate significantly faster than any reported digital logic gate made of the same material. As the integrated circuits become faster the data rate of the optoelectric time division multiplexing is increasible or decreasible with a suitably applied actuation pulse on the fiber to leave the on-chip loading essentially unchanged. In other words, optoelectronic switches actuating time division multiplexing sequences can keep pace with developments in integrated circuit technology.

Figure 4:
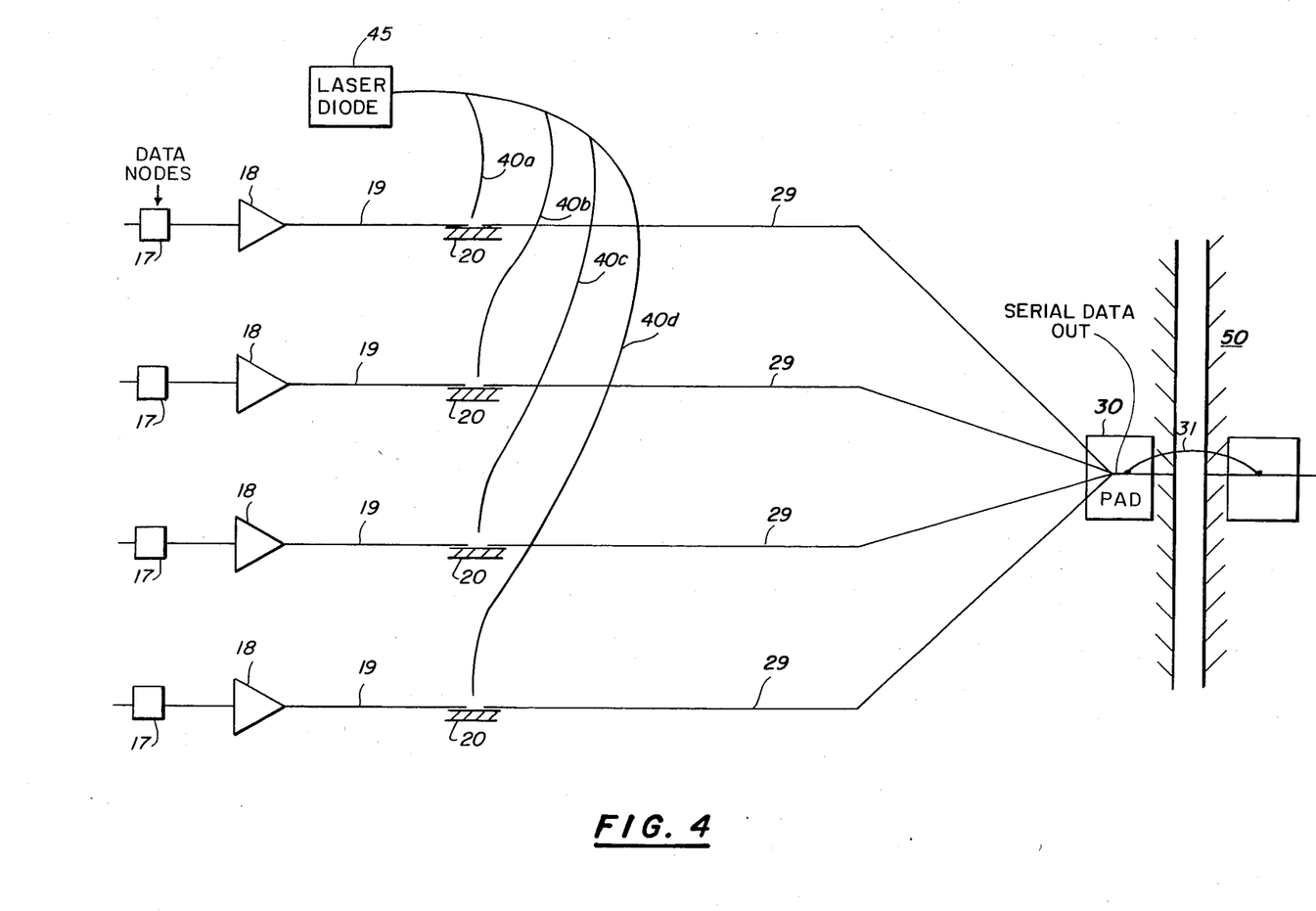
FIG. 4 shows a schematic, not to scale, typical laser actuated array of optoelectronic switches joined by differing lengths of optical fibers to effect time division multiplexing of parallel data to a bonding pad on an integrated circuit chip.

Looking to FIG. 4 an application of the inventive concept is illustrated having several optoelectronic switches 20 each serially interposed in the output microstrip 19 coming from a line driver 41 that is associated with one of the parallel output data nodes 17 of an integrated circuit chip. Each of the optoelectric switches in between microstrips 19 and 29, the latter reaching to a bonding pad 30 on the integrated circuit chip. Another microstrip or coaxial bond 31 extends from bonding pad 30 to other components mounted on a circuit board 50.

One of a plurality of optical fibers 40a, 40b, 40c and 40d extend of each of the optoelectronic switches from a common pulsed light source laser 45. The pulsed light source may be a laser or preferably a laser diode that will be able to activate a number of the optoelectronic switches. The optical fibers have varying lengths which are selected to cause a suitable delay to actuation light pulses reaching each of the optoelectronic switches. That is to say each time the laser diode emits a pulse a sequential delayed series of actuation pulses will be fed to the optoelectronic switches which are determined by the varying lengths of the optical fibers. The sequence of actuation pulses are equally spaced although the sequence may vary as desired.

Four optoelectronic switches with four fibers pulsed by only one light source or laser have been shown in FIG. 4 for purposes of explanation only. It is understood that more than one laser properly sequenced can actuate as many optoelectronic switches as can be sufficiently activated within the parameters of a desired optoelectronic switch actuation rate. A number of lasers and associated fibers and optoelectronic switches can be included to effect the high data rate switching demands of VLSI and VHSIC chips by merely duplicating the arrangement of this Fig.

Data requirements foreseen for switching information from a plurality of parallel data nodes to bonding pads on the chips are at rates up to 100-megabits per second for each of, for example, sixty-four switches. This would yield a serial bit rate of 6.4 gigabits per second or 150-picoseconds per bit. Laser output pulses from laser diode 45 would thus need to be 156-picoseconds wide at 10 nanosecond intervals.

Very short pulses in the picosecond range have been obtained from GaAs double heterostructure lasers in recent years. The techniques are basically fast current injection or gain switching and mode-locking. The former involves pumping the laser by short electrical pulses or with sinusoidal RF signals under various d.c. bias conditions. These have included application of a step recovery diode generator ("comb" generator) yielding pulses as short as 40-picoseconds at 100–500 MHz rates, a trap-doped triggerable laser producing 100-picosecond pulses, and an optoelectronic regenerative pulse generator giving 100-picosecond pulses at a 130 MHz rate. RF modulation of lasers has produced pulses of several tens of picoseconds width at hundreds of MHz rates.

Mode-locking laser diodes entail coupling an external optical cavity to the laser and adjusting the resulting cavity resonance to match the laser self-pulsation frequency, modulating the laser current at this frequency, or placing a saturable absorber within the cavity. Active and passive techniques can also be applied together. Pulse widths range between 1-picosecond, peak powers up to 1-watt and energies up to 16-picojoules have been demonstrated.

Distribution of the light to switches 20 begins with launching into the optical fibers 40a–40d from laser 45 in a manner which has been implemented in a number of commercial products. One successful approach involves tapering the fiber by a chemical etch and then melting its tip to form a hemispherical lens. This lens is held adjacent the laser diode and can average a coupling efficiency for 132 batch-produced laser-fiber couplers of about 80% (minus 1 dB) with a maximum of 92% (minus 3.5 dB) coupling.

It is quite possible to transmit the pulses of light from laser diode 45 by fanning out to a number of switches relatively efficiently by a transmissive star coupler. Transmissive star couplers are obtainable commercially with sixty-four or more output ports and approximately a 2 dB excess loss (in addition to the splitting loss) occurs through the coupler. Typical figures of total loss through the coupler are with a 16-port coupler, about −14.5 dB(0.035), a 32-port coupler having a −17.5 dB loss (0.018), and a 64-port coupler having a −22 dB coupling loss (0.0063).

Coupling the light from fibers 40a–40d to optoelectronic switches 20 is performed by applying techniques within the present state-of-the-art. A direct approach is to transmit light through the fiber and maximize the switch conduction by manipulating the fiber end over the switch area. The fiber can then be bonded into place with an adhesive such as UV curing adhesive 41 as mentioned above. Since the dimensions of the switch will be designed to match the fiber output beam of about 50-microns, fine adjustment should be in the neighborhood of 1-micron or more, a figure conveniently handled by present electrically-controlled manipulators or micropositioners. Refinements such as forming microlenses on the exit ends of the fibers or using rectangular cross-section fibers to enhance the coupling to the switches may be relied upon if felt warranted. A 1 dB loss at this interface is felt to be a reasonable estimate of the loss across this interface.

A high power laser may be selected such as an RCA CDH-LOC type driven by current pulsing and assuming 200-milliwatts peak optical power in 150-picosecond pulses or approximately 30-picojoule energy per pulse. The energy delivered to each switch assuming a 1 dB fiber-switch loss is estimated to be about 0.69-picojoules for sixteen ports, 0.34-picojoules for thirty-two ports and 0.12-picojoules for sixty-four ports. The lowest switching energy has been found to be about 0.3-picojoules in an InP optoelectronic switch so that it is forseeable that comparable results are obtainable in GaAs and Si to allow about sixteen switches to be driven with one laser.

Because of the complexity and data handling capability of quite a number of integrated circuit chips, there will be several lasers controlling up to sixty-four switches with 156-picosecond optical pulses at 10 nanosecond intervals. The limitations of pulsed jitter and drift in laser outputs have been investigated. A differential delay in a broad stripe (multimode) DH laser modulated at 0.8 MHz has indicated a jitter of not more than a few picoseconds. Differential delay changes have occurred on the order of tens of picoseconds with variations in temperature and d.c. current bias. Long term changes in temperature and bias current can be controlled by standard laser transmitter feedback techniques.

Figure 5:
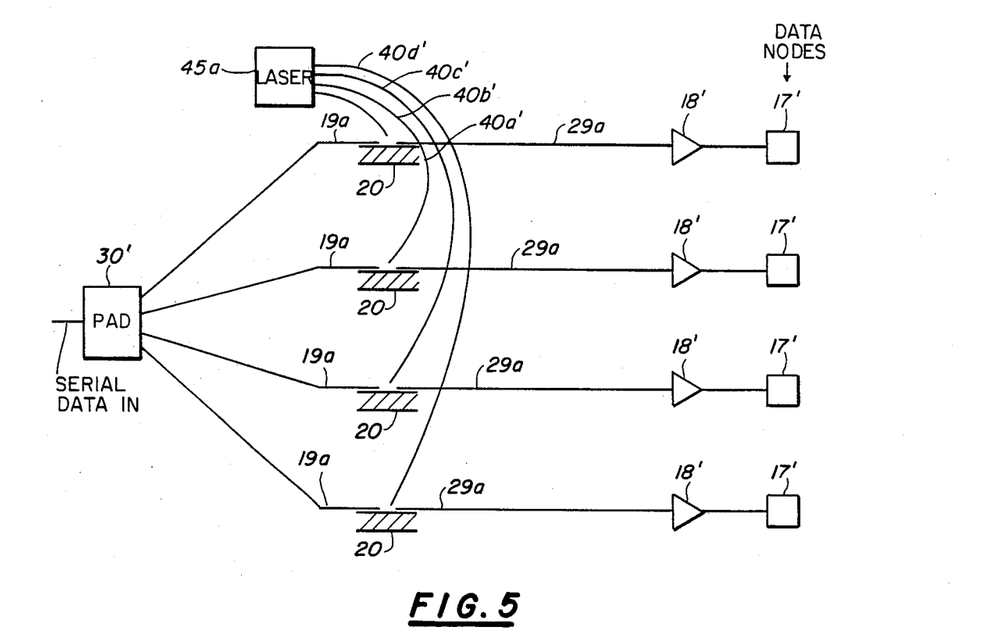
FIG. 5 shows a schematic, not to scale inputting arrangement of optoelectronic switches separating serial data into parallel form at a plurality of parallel data nodes on an integrated circuit chip.

The arrangement of FIG. 5 provides for a data transmission by which high speed serial input impulses to a chip are demultiplexed. Again, the demonstrative four optoelectronic switches 20 are shown operatively interposed between contiguous sections of microstrips 19a and 29a. A laser diode 45a couples pulses to the optoelectronic switches via different lengths of optical fiber 40a', 40b', 40c' and 40d'. It is understood that the numbers of the optoelectronic switches and the fibers are varied in accordance with the switching requirements at hand, and that the embodiment depicted in the figure is intended to be illustrative and not restrictive. Serial data coming to the bonding pad 30' from off-chip is switched to parallel form in a number of line drivers 18' which optionally may be interposed between the optoelectronic switches and a like number of parallel input data nodes 17'. Serial data appearing at input bonding pad 30' is demultiplexed by a sequence of spaced actuation pulses delivered to the optoelectronic switches in the proper timing sequence with incoming data pulses to switch one discretely timed different data pulse to each of parallel input data nodes 17'.

Figure 6:
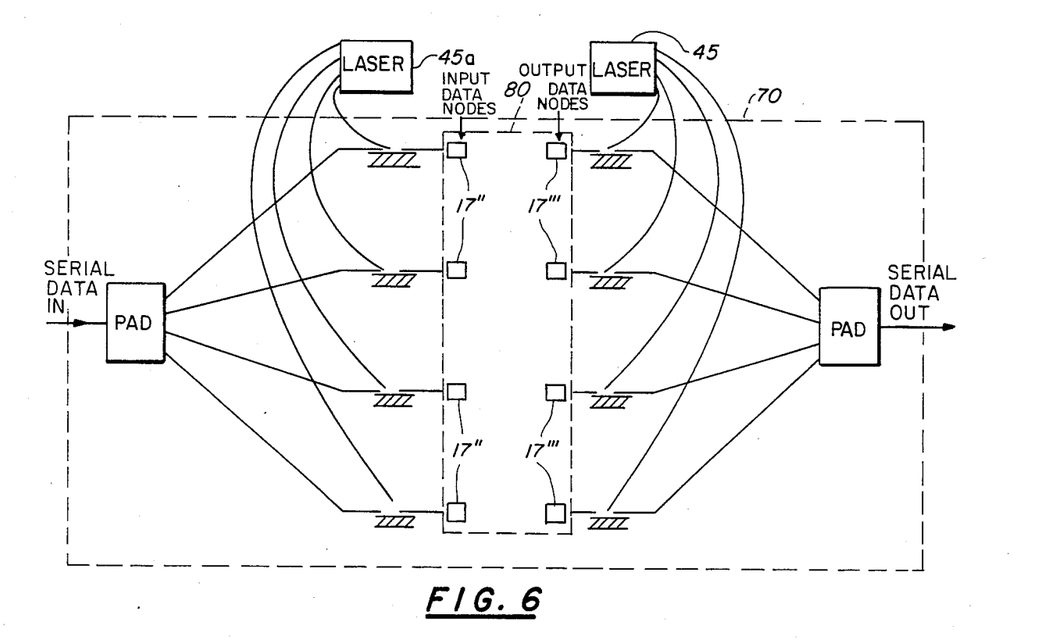
FIG. 6 shows an integrated circuit chip having a schematic, not to scale optoelectronic switching arrangement with associated fibers and actuating lasers appropriately disposed for controlling the input and output of a portion of an integrated circuit chip, it being understood that the rest of the chip is actuated comparably.

The embodiment of FIG. 6 shows a time division demultiplexing of a serial train of incoming data on the input data nodes 17" of a portion of an integrated circuit chip 70 and the time division multiplexing of data from a number of parallel data output nodes 17'" on the output side of a portion of an integrated circuit chip. The internal integrated circuitry 80 between the input and output data nodes can be whatever is necessary to provide the desired function. The hardware and circuit components of the laser-fiber-optoelectronic switch arrangement for this operation is substantially the same as that disclosed with respect to the embodiments of FIGS. 3 and 4 above, it being understood that synchronization of the demultiplexing via laser 45a to the multiplexing operation via laser 45 would also have to be provided for a combined demultiplexing and multiplexing of serial data to and from a chip.

Obviously many modifications and variations of the present invention are possible in the light of the above teachings. It is therefore to be understood that within the scope of the appended claims the invention may be practiced otherwise than as specifically described.

What is claimed is:

1. An apparatus for improving VLSI and VHSIC system data transmission comprising:
   at least one integrated circuit chip having a plurality of parallel output data nodes;
   a plurality of optoelectronic switches mounted in the integrated circuit chip, each having an input and an output microstrip extending therefrom and being serially disposed therebetween, each of the input microstrips extending to a separate one of the parallel output data nodes;
   at least one bonding pad on the chip coupled to the output microstrips extending from a like number of the plurality of optoelectronic switches to receive the outputs of a like number of parallel output data nodes therefrom;
   a light source emitting pulses of light;
   a plurality of optical fibers each having one end located to receive pulsed light from the source and the other end of each fiber is located adjacent an optoelectronic switch to activate a discrete optoelectronic switch, the fibers are longitudinally dimensioned to have lengths, different one from the other to create a sequence of actuation light pulses for the plurality of optoelectronic switches each time the light source is pulsed, the optoelectronic switches thereby providing time division multiplexed serial data from the plurality of parallel output data nodes at the bonding pad; and
   a line driver serially connected to each of the parallel output data nodes and the optoelectronic switches, metallic microstrips connect the serially coupled output data nodes, line drivers and optoelectronic switches to the bonding pad in parallel and the light source is a laser diode emitting pulses in the picosecond range at 100–500 MHz rates and the plurality of optical fibers have lengths to space the sequence of actuation light pulses between successive pulses from the laser diode.

2. An apparatus according to claim 1 in which the optoelectronic switches measure about ten microns on a side and each optical fiber is oriented to direct its actuation light pulse onto a photoconductive material in each optoelectronic switch to close each optoelectronic switch as part of a sequence.

3. An apparatus according to claim 2 in which the integrated circuit chip also has a plurality of parallel input data nodes and further including:
   a second plurality of optoelectronic switches mounted in the integrated circuit chip each having an input and an output microstrip extending therefrom and being serially disposed therebetween, each of the output microstrips extending to a separate one of the parallel input data nodes;
   at least one second bonding pad on the chip coupled to the input microstrips extending to a like number of the second plurality of optoelectronic switches to feed inputs to a like number of parallel input data nodes;
   a second light source emitting pulses of light;
   a plurality of optical fibers, each having one end located to receive pulsed light from the second source and the other end of each fiber is located adjacent an optoelectronic switch of the second plurality of optoelectronic switches to activate a discrete optoelectronic switch, the fibers are of different lengths to create a sequence of second actuation light pulses for the second plurality of optoelectronic switches each time the second source is pulsed, the second plurality of optoelectronic switches thereby providing time division demultiplexing of serial data at the second bonding pad to parallel form at the parallel input data nodes.

4. An apparatus according to claim 3 further including a line driver serially connected to each of the parallel input data nodes and the second optoelectronic switches.

5. An apparatus according to claim 4 in which metallic microstrips connect the serially coupled input data nodes, line drivers and second optoelectronic switches to the second bonding pad in parallel.

6. An apparatus for improving VLSI and VHSIC system data transmission comprising:
at least one integrated circuit chip having a bonding pad and a plurality of parallel input data nodes;
a plurality of optoelectronic switches mounted in the chip each having an input and an output microstrip extending therefrom and being serially disposed therebetween, each of the output microstrips extending to a separate one of the parallel input data nodes;
a light source emitting pulses of light;
a plurality of optical fibers, each having one end located to receive pulsed light from the source and the other end of each fiber is located adjacent an optoelectronic switch to activate a discrete optoelectronic switch, the fibers are of different lengths to create a sequence of actuation pulses for the plurality of optoelectronic switches each time the source is pulsed, the plurality of optoelectronic switches thereby providing time division demultiplexing of serial data from the bonding pad to parallel form at the parallel input data nodes.

7. An apparatus according to claim 6 further including a line driver serially connected to each of the parallel input data nodes and the optoelectronic switches.

8. An apparatus according to claim 7 in which metallic microstrips connect the serially coupled input data nodes, line drivers and optoelectronic switches to a second bonding pad in parallel.

9. A method of improving VLSI and VHSIC system data transmission comprising:
mounting a plurality of optoelectronic switches on the VLSI or VHSIC chip each between at least one bonding pad and a plurality of data nodes;
coupling one end of a plurality of optical of different lengths, each one to a different optoelectronic switch;
pulsing a light source next to the opposite ends of the optical fibers;
creating a sequence of actuation pulses each time the light source is pulsed due to the different path lengths in the optical fibers thereby multiplexing parallel data to serial form when the plurality of data nodes are parallel output data nodes or demultiplexing serial data into parallel form when the plurality of data nodes are parallel input data nodes.

* * * * *